United States Patent
Fu et al.

(10) Patent No.: US 9,594,277 B1
(45) Date of Patent: Mar. 14, 2017

(54) MULTI-DOMAIN PIXEL ARRAY

(71) Applicant: Google Inc., Mountain View, CA (US)

(72) Inventors: Pey Lung Fu, Taipei (TW); Mary Lou Jepsen, Sausalito, CA (US); Philip E. Watson, Mountain View, CA (US); Behnam Bastani, San Jose, CA (US); Carlin J. Vieri, Menlo Park, CA (US); Andrei S. Kazmierski, Pleasanton, CA (US); Adam E. Norton, Palo Alto, CA (US); Ya-Chi Lee, Sunnyvale, CA (US); Eddy Giing-Li Chen, Toufen (TW); Hung-Yu Chen, Zhubei (TW); Shenyi Tai, New Taipei (TW)

(73) Assignee: X Development LLC, Mountain View, CA (US)

( * ) Notice: Subject to any disclaimer, the term of this patent is extended or adjusted under 35 U.S.C. 154(b) by 3 days.

(21) Appl. No.: 14/733,745

(22) Filed: Jun. 8, 2015

Related U.S. Application Data

(60) Provisional application No. 62/154,464, filed on Apr. 29, 2015.

(51) Int. Cl.
*G02F 1/1337* (2006.01)
*G02F 1/1335* (2006.01)

(52) U.S. Cl.
CPC .. *G02F 1/133753* (2013.01); *G02F 1/133526* (2013.01); *G02F 1/133723* (2013.01); *G02F 1/133788* (2013.01); *G02F 2001/133757* (2013.01); *G02F 2001/133761* (2013.01)

(58) Field of Classification Search
CPC ......... G02F 1/133753; G02F 1/133788; G02F 1/13378; G02F 1/133723; G02F 1/134336; G02F 1/1337; G02F 2001/133757; G02F 2001/133761; G02F 2001/133746;
(Continued)

(56) References Cited

U.S. PATENT DOCUMENTS

| | | | |
|---|---|---|---|
| 7,978,271 B2 | 7/2011 | Wang et al. |
| 8,107,031 B2 | 1/2012 | Ong |
| 8,531,408 B2 | 9/2013 | Xu et al. |

(Continued)

FOREIGN PATENT DOCUMENTS

JP 2001-281669 * 10/2001 ........... G02F 1/1337

OTHER PUBLICATIONS

Gass, P. et al., "Patterned Photoalignment for Vertically Aligned LCDs," Sharp Corporation: Corporate Info: Technical Journal No. 4, Apr. 2003, © 2015 Sharp Corporation, pp. 1-7.

(Continued)

*Primary Examiner* — Thoi Duong
(74) *Attorney, Agent, or Firm* — Blakely Sokoloff Taylor & Zafman LLP

(57) ABSTRACT

A multi-domain liquid crystal pixel array includes two substrate layers and liquid crystal disposed between the two substrate layers. The multi-domain liquid crystal pixel array also includes at least one alignment layer having four or more alignment zones across the multi-domain liquid crystal pixel array. Each alignment zone has a different pre-tilt liquid crystal orientation than the other alignment zones. The alignment zones are configured to generate divergent image light with respect to a center of the multi-domain liquid crystal pixel array.

8 Claims, 6 Drawing Sheets

(58) Field of Classification Search
CPC .... G09G 2300/0447; G09G 2300/0439; Y10T 428/1005; Y10T 428/1023; Y10T 428/1018
USPC ... 349/129, 128, 187, 123, 5, 6, 7; 428/1.26, 428/1.25
See application file for complete search history.

(56) References Cited

U.S. PATENT DOCUMENTS 8,767,156 B2    7/2014   Inoue et al.
8,908,136 B2   12/2014   Chen et al.

OTHER PUBLICATIONS

Jeng, S.-C. et al., "Aligning liquid crystal molecules," SPIE Newsroom, Mar. 23, 2012, © SPIE 2012, pp. 1-2. DOI: 10.1117/2.1201203.004148.
Annis, C. et al., "Better Transmission: TFT-LCD Manufacturing Advances Reduce Cost and Energy Consumption," SID Information Display, 2009, Copyright © 2011-2015 Society for Information Display, Campbell, CA, pp. 1-5.

* cited by examiner

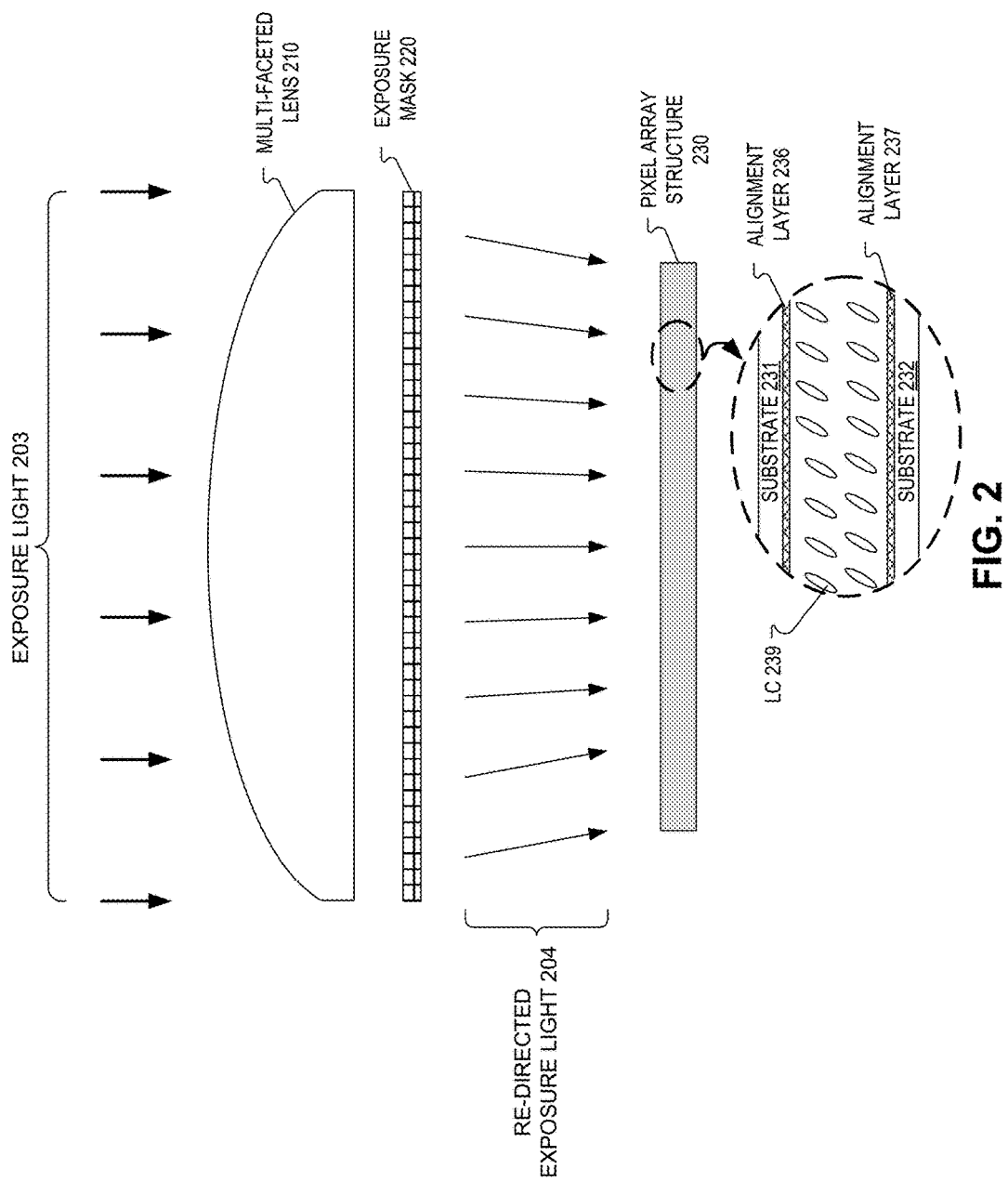

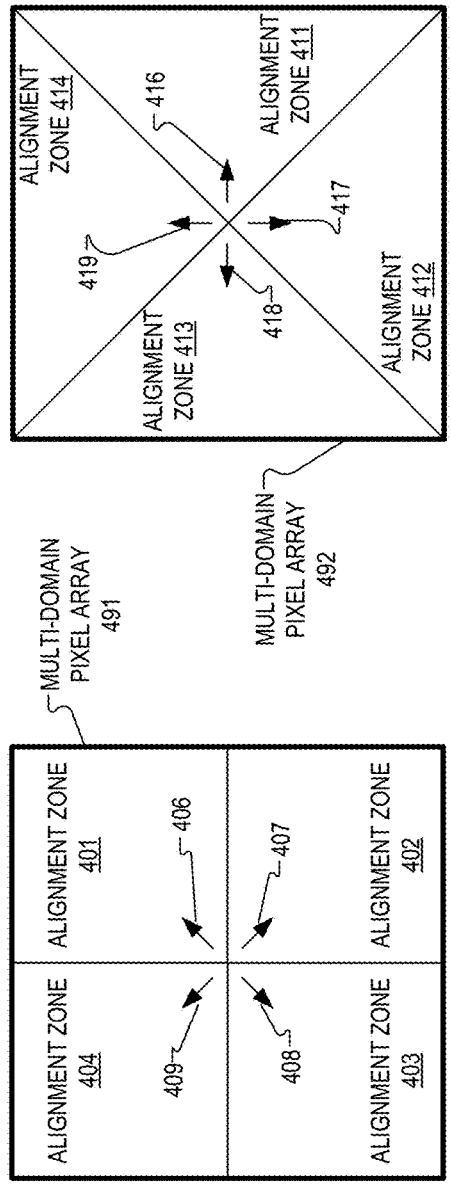
FIG. 4A
FIG. 4B
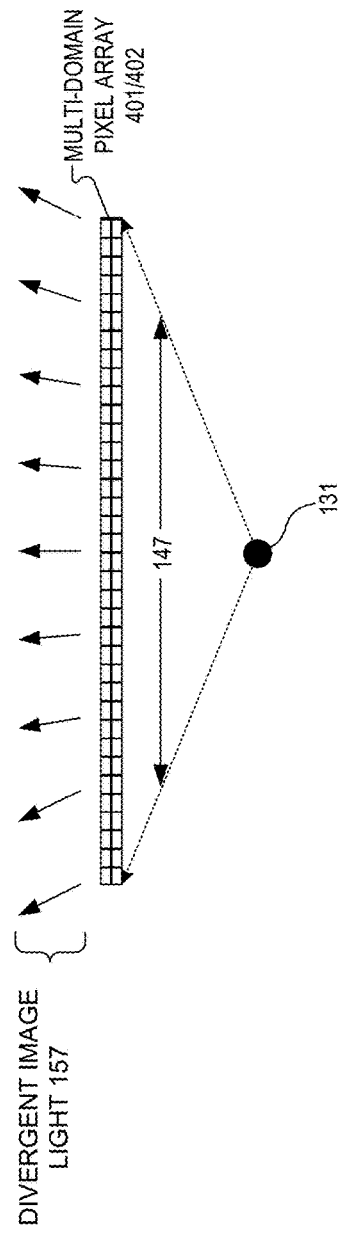
FIG. 4C

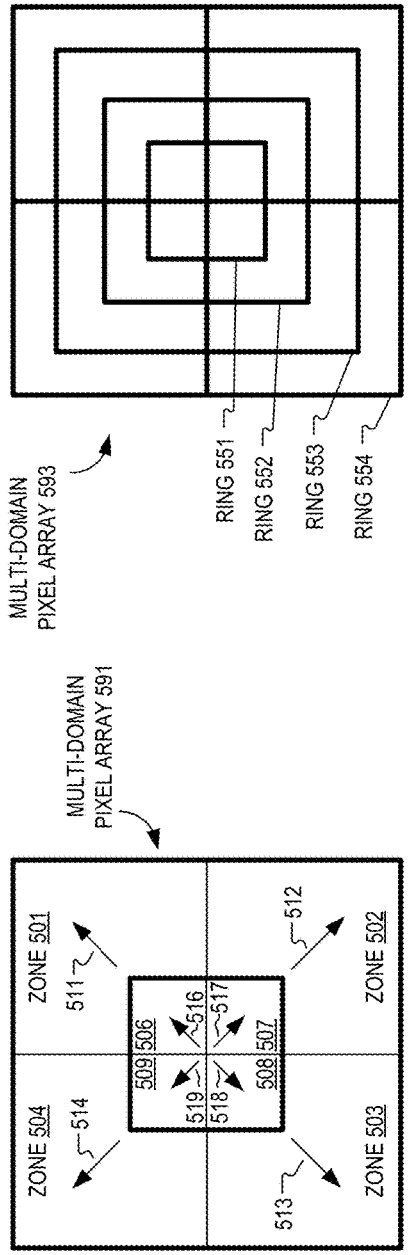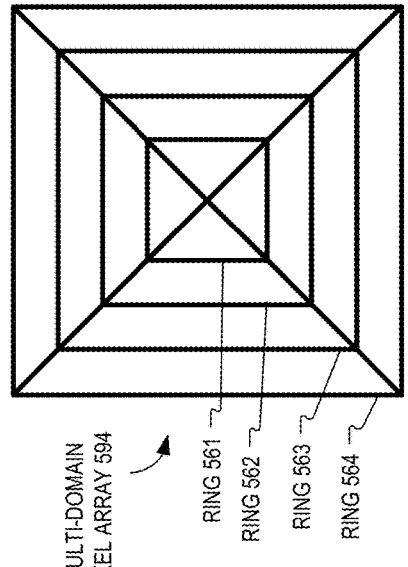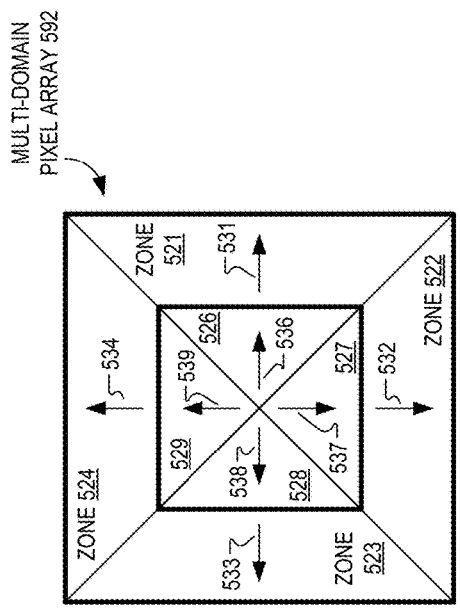

MULTI-DOMAIN PIXEL ARRAY

CROSS-REFERENCE TO RELATED APPLICATIONS

This application claims priority to U.S. Provisional Application No. 62/154,464 filed on Apr. 29, 2015, the contents of which are incorporated herein by reference.

TECHNICAL FIELD

This disclosure relates generally to display technologies, and in particular to multi-domain displays.

BACKGROUND INFORMATION

In conventional liquid crystal displays ("LCDs"), backlights emit source light that is modulated by liquid crystal pixels to generate an image on the LCD. However, routing layers, electronics, color-filters, polarizers, diffusers, and other optical layers included in the LCD result in a very small percentage (e.g. 5%) of the source light from the backlight that is actually transmitted as the image on the LCD. In addition to backlight efficiency, the contrast ratio and viewing angle of LCDs must be considered when designing the displays. The contrast ratio and viewing angle of LCDs requirements vary based on the context in which the LCD may be used. Optimizing an LCD for a particular viewing angle is desirable and can yield meaningful gains in backlight efficiency.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIG. 2 illustrates an example method of manufacturing a multi-domain liquid crystal pixel array, in accordance with an embodiment of the disclosure.

FIGS. 4A and 4B illustrate plan views of multi-domain liquid crystal pixel arrays that include alignment zones, in accordance with an embodiment of the disclosure.

FIG. 4C illustrates a multi-domain liquid crystal pixel array generating divergent image light, in accordance with an embodiment of the disclosure.

FIGS. 5A-5D illustrate multi-domain liquid crystal pixel arrays that include example alignment zone configurations, in accordance with an embodiment of the disclosure.

DETAILED DESCRIPTION

Embodiments of a multi-domain liquid crystal pixel array and methods of manufacturing the same are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
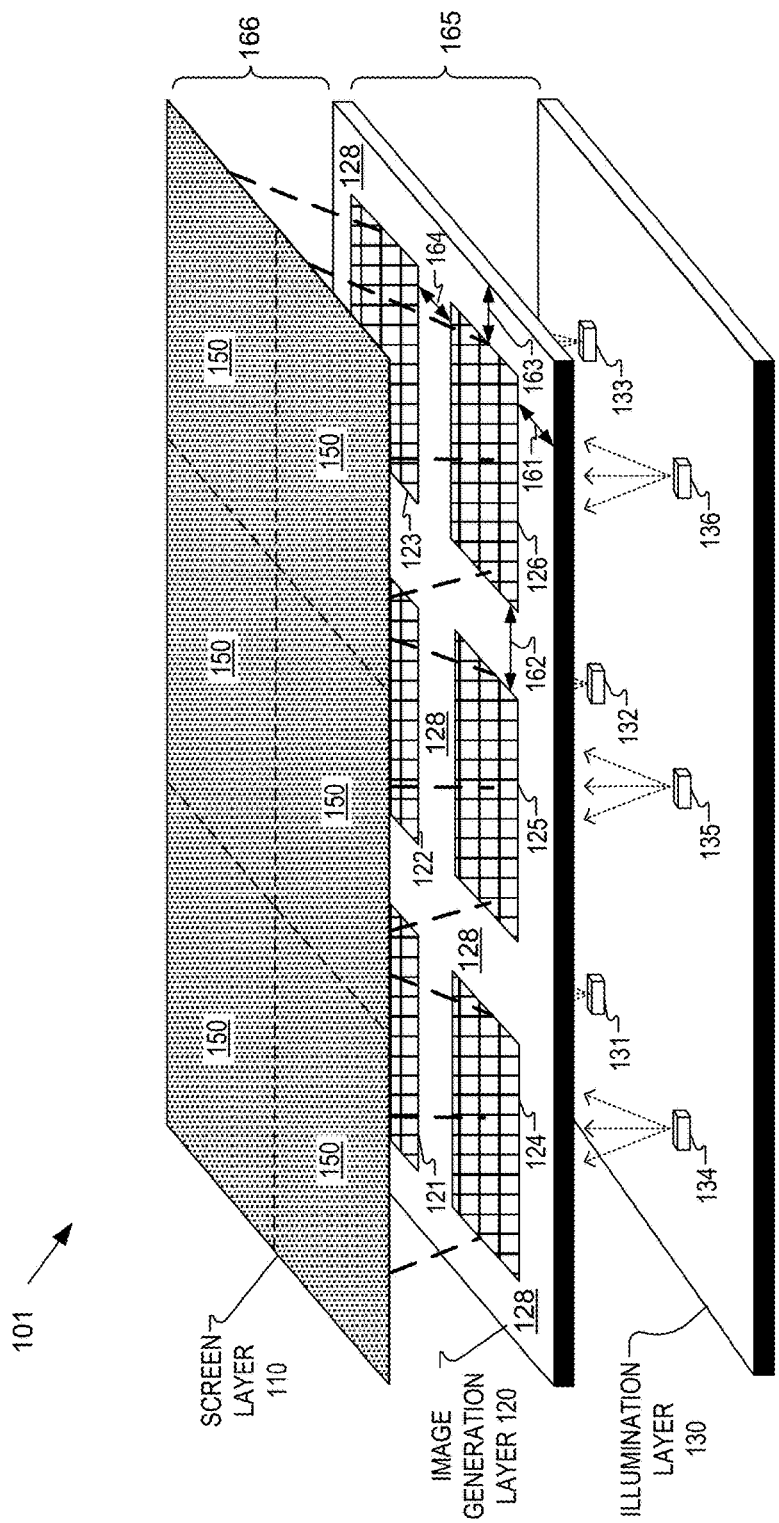
FIG. 1A illustrates a display apparatus that includes an image generation layer disposed between a screen layer and an illumination layer, in accordance with an embodiment of the disclosure.
Figure 1B:
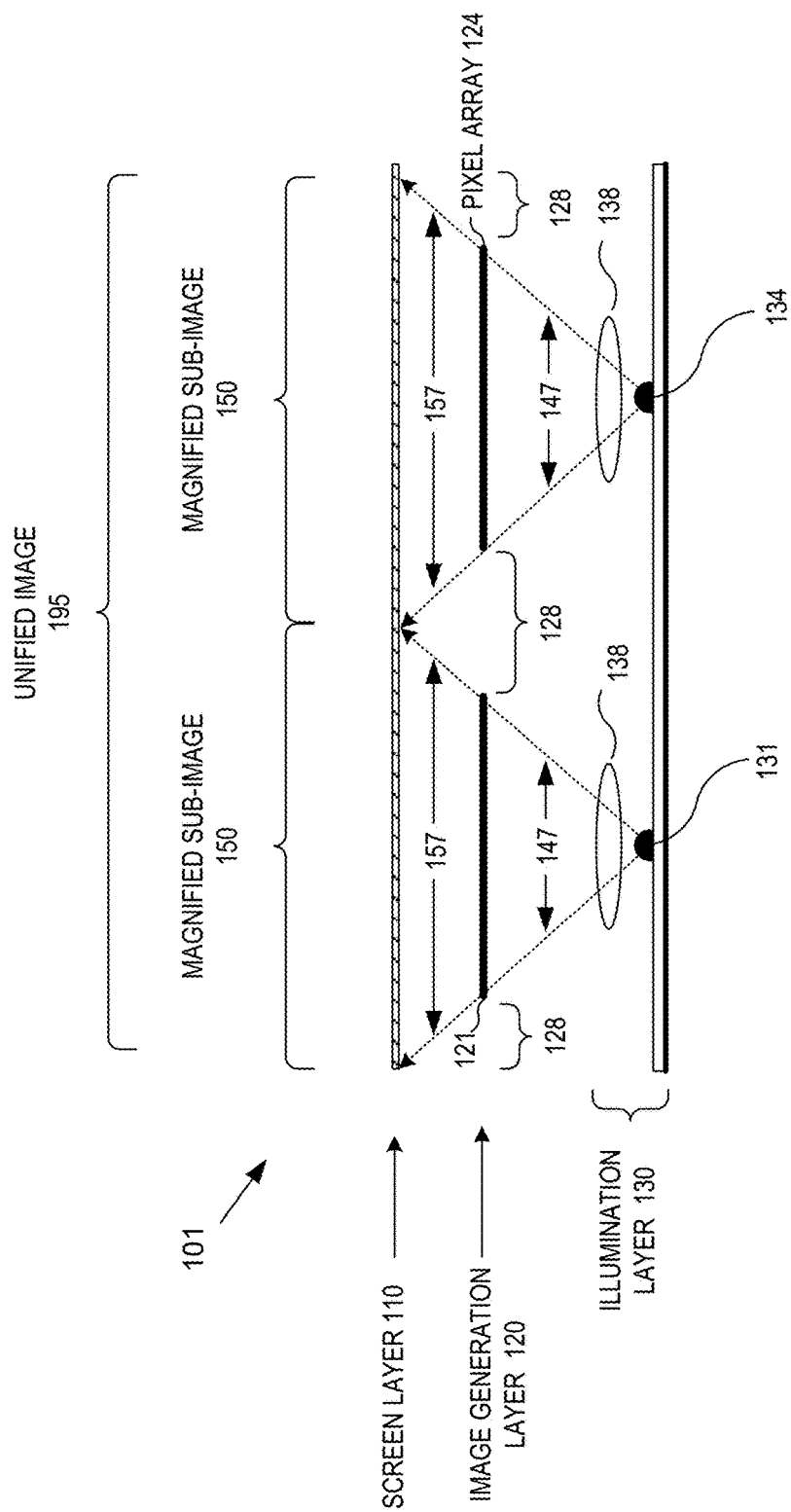
FIG. 1B is a side view schematic of the configuration of a portion of the display apparatus illustrated in FIG. 1A, in accordance with an embodiment of the disclosure.

FIGS. 1A and 1B illustrate functional layers of a rear projection display apparatus 101, in accordance with an embodiment of the disclosure. FIG. 1A is a perspective view of the layers of display apparatus 101 while FIG. 1B is a side view schematic of the configuration of a portion of the display apparatus illustrated in FIG. 1A. FIG. 1B shows FIG. 1A illustrates display apparatus 101 that includes an image generation layer 120, disposed between a screen layer 110 and an illumination layer 130. FIG. 1A shows that illumination layer 130 includes an array of illumination sources 131, 132, 133, 134, 135, and 136. Each light source in the array of light sources illuminates a corresponding pixel array to project the sub-image generated by the pixel array onto the screen layer 110 as magnified sub-image 150. The magnified sub-images 150 combine to form unified image 195. In the embodiment illustrated in FIG. 1A, each pixel array is a transmissive pixel array arranged in rows and columns (e.g. 100 pixel by 100 pixels). In one embodiment, each pixel array is a square one inch by one inch.

The illustrated embodiment of image generation layer 120 includes transmissive pixel arrays 121, 122, 123, 124, 125, and 126 separated from each other by spacing regions 128. The illustrated embodiment of screen layer 110 is divided into six regions for displaying sub-images 150 of an overall unified image 195. Display 101 is made up of a plurality of pixlets, each including an illumination source (e.g. 134), transmissive pixel array (e.g. 124), and a screen region for displaying a sub-image 150 all aligned within a column through display 101. Multiple pixlets are separately projected such that together they form a tiled, seamless image at the screen layer 110.

In the illustrated embodiment, each illumination source is aligned under a corresponding pixel array to illuminate a backside of the corresponding pixel array with lamp light. For example, illumination source 131 corresponds with pixel array 121 and illumination source 134 corresponds with pixel array 124. Illumination sources 131-136 may be implemented as independent light sources (e.g., color or monochromatic LEDs, quantum dots, etc.) that generate a divergent projection beam 147 having a well-defined angular extent or cone to fully illuminate their corresponding transmissive pixel array residing above on image generation layer 120. In one embodiment, the angular extent of projection beam 147 is twenty degrees. Projection beam 147 becomes divergent image light 157 that includes sub-image 150 after proceeding through the transmissive pixel array as the image light is modulated by the sub-image driven onto the transmissive pixel array. Each illumination source appears approximately as a point source to its corresponding pixel array.

The illumination layer 130 and image generation layer 120 are separated from each other by a fixed distance 165 (e.g. 8 mm). This separation may be achieved using a transparent intermediary (e.g. glass or plastic layers) and may further include one or more lensing layers 138 (including lenses, apertures, beam confiners, etc.) to control or manipulate the angular extent and cross-sectional shape of the lamp light emitted from the illumination sources. In one embodiment, an illumination controller may be coupled to the illumination sources 131-136 to control their illumination intensity. Illumination layer 130 may include a substrate upon which the illumination sources 131-136 are disposed.

Transmissive pixel arrays 121-126 are disposed on the image generation layer 120 and each includes an array of transmissive pixels (e.g. 100 pixels by 100 pixels). Each pixel array is one inch square, in one embodiment. Each transmissive pixel array is an independent display array that is separated from adjacent transmissive pixel arrays by spacing regions 128 on image generation layer 120. The internal spacing distance 162 and 164 that separate adjacent pixel arrays from each other may be twice the width as the perimeter spacing distance 161 and 163 that separate a given pixel array from an outer edge of image generation layer 120. In one embodiment, the internal spacing distance 162 and 164 have a width of 4 mm while the perimeter spacing distance 161 and 163 have a width of 2 mm. Of course, other dimensions may be implemented.

As illustrated, transmissive pixel arrays 121-126 are spaced across image generation layer 120 in a matrix with spacing distance 162 and 164 separating each transmissive pixel array 121-126. Spacing distances 161-164 are significantly larger than the inter-pixel separation between pixels of a given transmissive pixel array 121-126. Spacing regions 128 improve signal routing option and/or make space available for the inclusion of additional circuitry, such as a display controller. Spacing region 128 that resides along the exterior perimeter also provides space for power and/or communication ports.

Although FIG. 1A illustrates image generation layer 120 as including six transmissive pixel arrays 121-126 arranged into two rows and three columns, it should be appreciated that various implementations of display 101 may include more or fewer transmissive pixel arrays organized into differing combinations of rows and columns. As such, in embodiments having a one-to-one ratio of illumination sources 131-136 to transmissive pixel arrays 121-126, the number and layout of illumination sources on illumination layer 130 may also vary. While FIG. 1A does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise.

Transmissive pixel arrays 121-126 are switched under control of a display controller to modulate divergent projection beam 147 into becoming divergent image light 157 and project sub-image 150 onto screen layer 110. Sub-images 150 collectively blend together to present a unified image 195 to a viewer from the viewing side of screen layer 110 that is substantially without seams. In other words, the sub-images created by transmissive pixel arrays 121-126 are magnified as they are projected across separation 166 (e.g., 2 mm) between image generation layer 120 and screen layer 110. The sub-images 150 are magnified enough to extend over and cover spacing region 128 forming a seamless unified image 195. The magnification factor is dependent upon separation 166 and the angular spread of divergent projection beam 147 emitted by illumination sources 131-136. In one embodiment, sub-image 150 is magnified by a factor of approximately 1.5. Not only does the unified image 195 cover the internal spacing distances 162 and 164, but also covers the perimeter spacing distances 161 and 163. As such, display 101 may be positioned adjacent to other display tiles 101 and communicatively interlinked to form larger composite seamless displays, in which case the unified image 195 generated by a single display tile becomes a sub-portion of a multi-tile unified image.

In conventional LCD displays, the image light generated by the LCD generally propagates normal to the plane of the pixel array. However, in the tiled rear-projection architecture illustrated in FIGS. 1A and 1B, the image light generated by transmissive pixel arrays 121-126 is divergent image light. At the center of transmissive pixel array 121, for example, divergent image light 157 will propagate normal to transmissive pixel array 121. However, at the edge of transmissive pixel array 121, divergent image light 157 does not propagate toward screen layer 110 at an angle normal to the plane of transmissive pixel array 121—it has an angle. Furthermore, divergent image light 157 propagates toward screen layer 110 at a different angle than the divergent image light 157 at the opposite end of transmissive pixel array 121. Therefore, it is desirable to have a transmissive pixel array that is designed to improve optical performance (e.g. contrast ratio and/or viewing angle) when divergent image light is generated. One path to accomplish the improvement is replacing pixel arrays 121-126 with multi-domain liquid crystal pixel arrays by giving different liquid crystal alignments at different locations in the multi-domain liquid crystal pixel array.

FIGS. 4A and 4B illustrate plan views of multi-domain liquid crystal pixel arrays that include alignment zones, in accordance with an embodiment of the disclosure. FIG. 4A include a multi-domain liquid crystal pixel array 491 that includes four alignment zones 401, 402, 403, and 404 that give multi-domain liquid crystal pixel array 491 four domains. For the purposes of this disclosure, the term "alignment zone" will be discussed in reference to portions of multi-domain liquid crystal pixel arrays as viewed from a plan view of the multi-domain liquid crystal pixel array. And in contrast to some conventional LCDs that include multi-domain pixels (where there are multiple alignments in a pixel), each "alignment zone" in this disclosure includes a plurality of pixels that are mono-domain pixels. In FIG. 4A, alignment zones 401, 402, 403, and 404 are square and intersect at a center of multi-domain liquid crystal pixel array 491. Each alignment zone has a different pre-tilt liquid crystal orientation than the other alignment zones. In one embodiment, alignment zone 401 covers a 25×25 pixel array.

Arrows 406, 407, 408, and 409 show the pre-tilt liquid crystal orientation of each of the alignment zones. Each arrow shows that the alignment direction of the liquid crystal is away from the center of multi-domain liquid crystal pixel array 491 to generate divergent image light 157 with respect to the center of the multi-domain liquid crystal pixel array 491. In FIG. 4A, the direction of each arrow 406, 407, 408, and 409 is to the outside corner of the respective alignment zones 401, 402, 403, and 404.

FIG. 4B include a multi-domain liquid crystal pixel array 492 that includes four alignment zones 411, 412, 413, and 414 that give multi-domain liquid crystal pixel array 492 four domains. In FIG. 4B, alignment zones 411, 412, 413, and 414 are triangular and intersect at a center of multi-domain liquid crystal pixel array 492. Each alignment zone has a different pre-tilt liquid crystal orientation than the other alignment zones. Arrows 416, 417, 418, and 419 show the pre-tilt liquid crystal orientation of each of the alignment zones. Each arrow shows that the alignment direction of the liquid crystal is away from the center of multi-domain liquid crystal pixel array 492 to generate divergent image light 157 with respect to the center of the multi-domain liquid crystal pixel array 492. In FIG. 4B, the direction of each arrow 416, 417, 418, and 419 is to the outside corner of the respective alignment zones 411, 412, 413, and 414. Although not illustrated, in one embodiment, FIGS. 4A and 4B may include a fifth alignment zone at the center of the multi-domain liquid crystal pixel arrays 491/492. In that embodiment, the fifth alignment zone would not be biased with a pre-tilt orientation Rather, the pixels in the fifth alignment zone would be vertically aligned.

In FIG. 4C, illumination source 131 (and any associated optics 138) generate divergent beam 147 which becomes divergent image light 157 after passing through multi-domain liquid crystal pixel array 491/492. The pre-tilt liquid crystal orientation of the alignment zones allows for increased optical efficiency of multi-domain liquid crystal pixel arrays since divergent projection beam 147 can simply be modulated in generating divergent image light 157 rather than also having to redirect divergent projection beam 147 into divergent image light 157. For example, each pixel can modify the polarization of projection beam 147 to generate divergent image light 157. The pre-tilt of the liquid crystal orientation of the alignment zones may be matched to the angle of divergent beam 147 so that divergent image light 157 has the same divergence angle of divergent beam 147. In some embodiments, the pre-tilt liquid crystal orientation may be homogenous across each alignment zone. In other embodiments, the pre-tilt liquid crystal orientation may follow a divergence gradient that increases angle value of the pre-tilt liquid crystal orientation as the pixels increase in distance from the center of the multi-domain liquid crystal pixel array. In this embodiment, the exit angle of divergent image light 157 increases as the distance increases from the center of multi-domain liquid crystal pixel array 491/492, where the exit angle is defined as the angle variance from a vector oriented orthogonal to the center of multi-domain liquid crystal pixel array 491/492.

Traditionally, liquid crystal alignment in LCDs has been accomplished by a known process called "rubbing." However, the "rubbing" process is not necessarily conducive to giving an LCD different liquid crystal alignments at different locations because of various manufacturing challenges.

FIG. 2 illustrates an example method of manufacturing a multi-domain liquid crystal pixel array, in accordance with an embodiment of the disclosure. FIG. 2 shows side views of a multi-faceted lens 210, an exposure mask 220, and pixel array structure 230. In the illustrated example, array structure 230 includes substrate layers 231 and 232, top alignment layer 236, bottom alignment layer 237, and liquid crystal 239. Other required elements may also be included in pixel array structure 230, although not specifically illustrated. Liquid crystal 239 is disposed between the two substrate layers 231 and 232. The substrate layers 231 and 232 may be made from glass. Substrates 231 and 232 include indium tin oxide ("ITO"), in one embodiment. The alignment layers include polyimide, in one embodiment. The alignment layers include polyamide, in some embodiments.

Figure 3A:
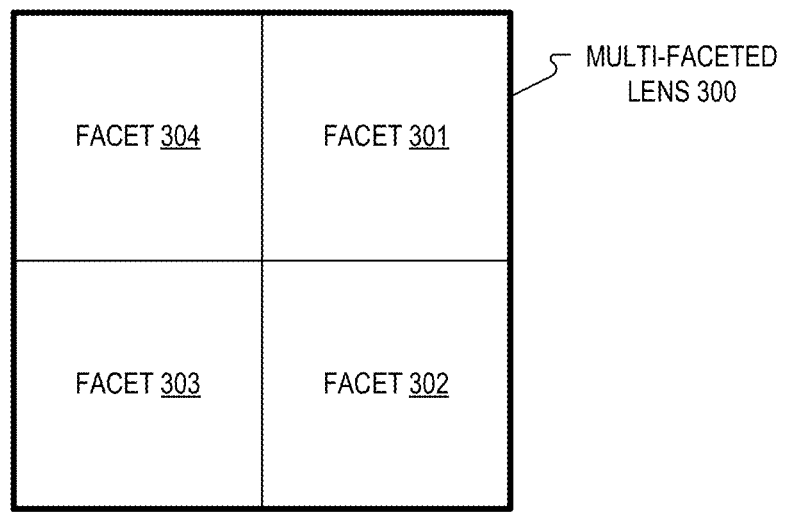
FIGS. 3A and 3B illustrate plan views of example multi-faceted exposure lenses that can be utilized in manufacturing a multi-domain liquid crystal pixel array, in accordance with an embodiment of the disclosure.
Figure 3B:
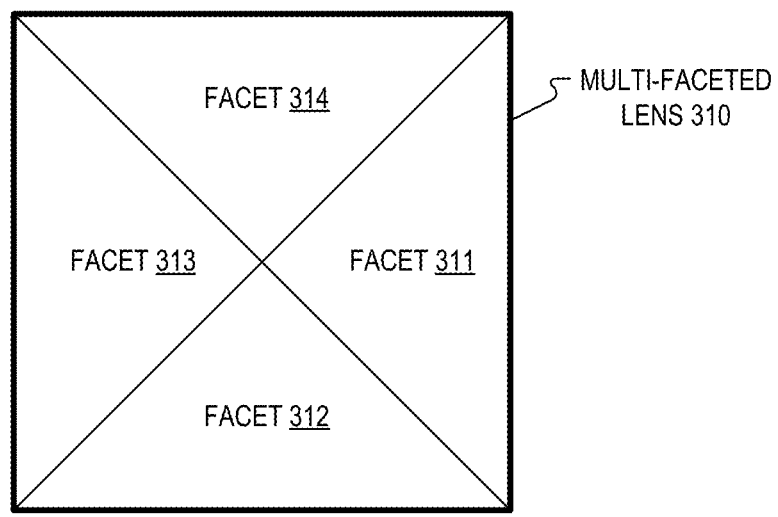

FIGS. 3A and 3B illustrate plan views of example multi-faceted exposure lenses that can be used as multi-faceted lens 210, in accordance with an embodiment of the disclosure. Multi-faceted lens 300 is used to fabricate multi-domain liquid crystal pixel array 491 while multi-faceted lens 310 would be used to fabricate multi-domain liquid crystal pixel array 492. Multi-faceted lens 300 and multi-faceted lens 310 have four facets—one for each alignment zone to be created in multi-domain liquid crystal pixel array 491/492. Facets 301-304 of multi-faceted lens 300 intersect at a central optical axis of multi-faceted lens 300 and facets 301-304 of multi-faceted lens 310 intersect at a central optical axis of multi-faceted lens 310.

To fabricate a multi-domain liquid crystal pixel array, pixel array structure 230 is exposed to exposure light 203 that travels through multi-faced lens 210 and exposure mask 220. Exposure light may be ultraviolet ("UV") light from a UV light source. The exposure duration of exposure light 203 light may be approximately three seconds in one embodiment, although it will vary based on the specific method utilized. Exposure light 203 encounters multi-faceted lens 210 which redirects the light as re-directed exposure light 204. Re-directed exposure light 204 converges toward the focal point of multi-faceted lens 210 which is behind pixel array structure 230. Generally, the re-directed exposure light 204 will also encounter an exposure mask 220, which may include pixel boundaries. The angles at which re-directed exposure light 204 encounters pixel array structure 230 may be the desired angles for divergent image light 157 to exit multi-domain liquid crystal pixel array 491/492 when pixel array 491/492 is illuminated by illumination source 131.

Exposing pixel array structure 230 to exposure light 203 generates the alignment zones in the one or more alignment layers (e.g. top alignment layer 236 and bottom alignment layer 237) within pixel array structure 230. Generating the alignment zones is accomplished by forming a surface in the alignment layers that fixes a pre-tilt angle of the liquid crystal between the substrates. Fixing the pre-tilt angle of the liquid crystal in each alignment zone can be accomplished using a variety of methods.

In one method, alignment layers 236 and 237 are sensitive to the angle of re-directed exposure light 204, which breaks the bonds with polyimide molecules in the alignment layers that translates to fixing a pre-tilt angle in the alignment layer. In another method, a UV-curable monomer is mixed with liquid crystal 239. Then, a voltage is applied across substrates 231-232 while the mixture of liquid crystal 239 and UV-curable monomer is exposed to UV light. The UV-curable monomer is cross-linked by UV light, which forms an angularly biased lattice structure through the bulk of the liquid crystal that provides additional alignment functionality to the liquid crystal. The lattice structure may bond to surface polyimides in the alignment layers 236/237. The additional alignment functionality of each pixel can be manipulated by using different mixture recipes of the monomer and polymer in addition to varying the voltage applied to each pixel.

First, second, third, and fourth voltages are applied to first, second, third, and fourth alignment zones, respectively, while the alignment layer is exposed to the exposure light, in some embodiments. The first, second, third, and fourth voltages applied to the pixels of the multi-domain liquid crystal pixel array during the exposure fixes the pre-tilt liquid crystal orientation of the pixels to direct the display light in the desired directions. Different voltages can be applied to different alignment zones to create multiple alignment zones. Varying the exposure duration of the re-directed exposure light 204 can also affect the pre-tilt angle of the liquid crystal in each pixel. Hence, varying these variables for each pixel makes it possible to make incremental changes to the pre-tilt angle of the liquid crystal 239 on a pixel-by-pixel basis.

FIGS. 5A-5D illustrate multi-domain liquid crystal pixel arrays that include example alignment zone configurations, in accordance with an embodiment of the disclosure. In FIG. 5A, multi-domain liquid crystal pixel array 591 includes eight alignment zones 501, 502, 503, 504, 506, 507, 508, and 509. Alignment zones 506, 507, 508, and 509 are outer alignment zones while alignment zones 501, 502, 503, 504 are an intersecting alignment zones inside the outer alignment zones. Arrows 511, 512, 513, 514, 516, 517, 518, and 519 show the pre-tilt liquid crystal orientation of each of the alignment zones. Each arrow shows that the alignment direction of the liquid crystal is away from the center of multi-domain liquid crystal pixel array 591 to generate divergent image light 157 with respect to the center of the multi-domain liquid crystal pixel array 591. In FIG. 5A, the direction of each arrow 511, 512, 513, 514, 516, 517, 518, and 519 is to the outside corner of the respective alignment zones 501, 502, 503, 504, 506, 507, 508, and 509. The pre-tilt angle value of alignment zones 506, 507, 508, and 509 is greater than the pre-tilt angle value of alignment zones 501, 502, 503, 504 so that the divergent image light 157 has a larger exit angle toward the edges of multi-domain liquid crystal pixel array 591. It is understood that the pre-tilt angle value of alignment zones 506-509 may be the same, even while their pre-tilt liquid crystal orientation is different. This is because, while the alignment zones direct projection beam 147 in different directions, the divergence angle of divergent image light 157 may be the same with respect to the center of the multi-domain liquid crystal pixel array. In other words, divergent image light 157 may be symmetric about a center of the multi-domain liquid crystal pixel array.

In FIG. 5B, multi-domain liquid crystal pixel array 592 includes eight alignment zones 521, 522, 523, 524, 526, 527, 528, and 529. Alignment zones 526, 527, 528, and 529 are outer alignment zones while alignment zones 521, 522, 523, 524 are an intersecting alignment zones inside the outer alignment zones. Arrows 531, 532, 533, 534, 536, 537, 538, and 539 show the pre-tilt liquid crystal orientation of each of the alignment zones. Each arrow shows that the alignment direction of the liquid crystal is away from the center of multi-domain liquid crystal pixel array 592 to generate divergent image light 157 with respect to the center of the multi-domain liquid crystal pixel array 592. In FIG. 5B, the direction of each arrow 531, 532, 533, 534, 536, 537, 538, and 539 is to the outside corner of the respective alignment zones 521, 522, 523, 524, 526, 527, 528, and 529. The pre-tilt angle value of alignment zones 526, 527, 528, and 529 is greater than the pre-tilt angle value of alignment zones 521, 522, 523, 524 so that the divergent image light 157 has a larger exit angle toward the edges of multi-domain liquid crystal pixel array 592.

FIG. 5C shows multi-domain liquid crystal pixel array 593 that is similar to multi-domain liquid crystal pixel array 591, except that multi-domain liquid crystal pixel array 593 includes sixteen alignment zones instead of eight alignment zones. There are four alignment rings (551-554) each having four alignment zones. In multi-domain liquid crystal pixel array 593, each alignment zone in the alignment rings share the same pre-tilt angle value. The angle value of each alignment ring increases as the alignment zones get farther from the center. In other words, the angle value is greater in alignment ring 554 than the angle value of alignment ring 553, the angle value is greater in alignment ring 553 than the angle value of alignment ring 552, and the angle value is greater in alignment ring 552 than the angle value of alignment ring 551.

FIG. 5D shows multi-domain liquid crystal pixel array 594 that is similar to multi-domain liquid crystal pixel array 592, except that multi-domain liquid crystal pixel array 594 includes sixteen alignment zones instead of eight alignment zones. There are four alignment rings (561-564) each having four alignment zones. In multi-domain liquid crystal pixel array 594, each alignment zone in the alignment rings share the same angle value. The angle value of each alignment ring increases as the alignment zones get farther from the center. In other words, the angle value is greater in alignment ring 564 than the angle value of alignment ring 563, the angle value is greater in alignment ring 563 than the angle value of alignment ring 562, and the angle value is greater in alignment ring 562 than the angle value of alignment ring 561.

Fabricating multi-domain liquid crystal pixel arrays 591-594 utilizes similar fabrication methods as manufacturing multi-domain liquid crystal pixel arrays 491 and 492 although additional process steps may be required in some methods. Taking multi-domain liquid crystal pixel arrays 591 or 592 as an example, an inner alignment portion (e.g. zones 506-509 or zones 526-529) of the alignment layer(s) (e.g. alignment layer 236/237) may be masked to prevent the inner alignment portions from being exposed to the initial exposure light. Exposure mask 220 may be used to mask the inner alignment layers from exposure light 203. Zones 501-504 or 521-524 are exposed to the exposure light (e.g. exposure light 203) and associated multi-faceted lens (e.g. lens 300 or 310) while the inner alignment portions remain masked. Then, the masking of the inner alignment portion of the alignment layer is removed after exposure to the exposure light. The outer alignment portion (e.g. zones 501-504 or 521-524) of the alignment layer(s) are masked to prevent exposure to a second exposure light. The original multi-faceted lens 300/310 may be removed and replaced by a different, second multi-faceted lens. Then, the inner alignment portion is exposed to the second exposure light, which propagates through the second multi-faceted lens as second re-directed exposure light. The first multi-faceted lens may have a higher optical power than the second multi-faceted lens so that the second re-directed exposure light has a different angle than the first re-directed exposure light 204.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A multi-domain liquid crystal pixel array comprising:
   two substrate layers;
   liquid crystal disposed between the two substrate layers; and at least one alignment layer having four or more alignment zones across the multi-domain liquid crystal pixel array, wherein each alignment zone has a different pre-tilt liquid crystal orientation for the liquid crystal than the other alignment zones, wherein the alignment zones are configured to generate divergent image light with respect to a center of the multi-domain liquid crystal pixel array, and wherein each of the alignment zones includes a plurality of mono-domain pixels.

2. The multi-domain liquid crystal pixel array of claim 1, wherein at least four of the alignment zones have a same magnitude angle value of the pre-tilt liquid crystal orientation to generate the divergent image light that is symmetric about the center of the multi-domain liquid crystal pixel array.

3. The multi-domain liquid crystal pixel array of claim 1, wherein the multi-domain liquid crystal pixel array is square.

4. The multi-domain liquid crystal pixel array of claim 1, wherein the alignment zones include four intersecting alignment zones that intersect at the center of the multi-domain liquid crystal pixel array.

5. The multi-domain liquid crystal pixel array of claim 4, wherein the pre-tilt liquid crystal orientation of the four intersecting alignment zones are graded according to a divergence gradient that increases an angle value of the pre-tilt liquid crystal orientation for pixels in the multi-domain liquid crystal pixel array as the pixels increase in distance from the center of the multi-domain liquid crystal pixel array.

6. The multi-domain liquid crystal pixel array of claim 4, wherein the four intersecting alignment zones are an inner ring of four outer alignment zones, wherein the four intersecting alignment zones have a first angle value of the pre-tilt liquid crystal orientation, and wherein the four outer alignment zones have a second angle value of the pre-tilt liquid crystal orientation, the second angle value being greater than the first angle value.

7. The multi-domain liquid crystal pixel array of claim 1, wherein the at least one alignment layer includes a polyimide layer disposed on both of the two substrate layers.

8. The multi-domain liquid crystal pixel array of claim 1, wherein a lattice structure is formed through a bulk of the liquid crystal, the lattice structure providing additional alignment to the liquid crystal.

* * * * *